Dec. 29, 1931.                C. M. ADAMS                1,839,077
                              PRESSURE GAUGE
                            Filed June 30, 1928

Inventor
Clark M. Adams,
By Owen & Owen,
Attorneys

Patented Dec. 29, 1931

1,839,077

UNITED STATES PATENT OFFICE

CLARK M. ADAMS, OF TOLEDO, OHIO, ASSIGNOR, BY MESNE ASSIGNMENTS, TO MOTO METER GAUGE & EQUIPMENT CORPORATION, OF NEW YORK, N. Y., A CORPORATION OF DELAWARE

PRESSURE GAUGE

Application filed June 30, 1928. Serial No. 289,354.

This invention relates in general to a pressure indicating means or gage for the indication of the relative or absolute pressure in any system under observation and in particular to the type of gage mounted on the dash of an automobile to indicate to the driver the relative amount of pressure present in any of the various working parts of the automobile, such as the oiling system, brakes or the like.

In gages of this type, it is customary to obtain indications by means of a needle actuated in response to variations in pressure through the medium of a Bourdon tube, which has a comparatively small amplitude of movement. In view of this fact, it is one of the important objects of the present invention to provide improved means for obtaining a high multiplication of movement between the tube and the needle, while still maintaining a simple, compact and inexpensive construction.

It is also an object of the invention to provide a gage which is quickly responsive, without appreciable lost motion, to any variation in pressure, and which indicates low initial pressures, as well as comparatively high pressures, with substantial accuracy.

The gage is also constructed so that the connections between the tube and the needle may be easily adjusted, and so that the movements of the needle and the scale indications, with relation to variations in pressure, may have any character desired.

The improved features of the invention, together with the advantages resulting therefrom, will be more particularly explained in connection with the accompanying drawings, which illustrate the same in detail.

In the drawings:—

Figure 1:
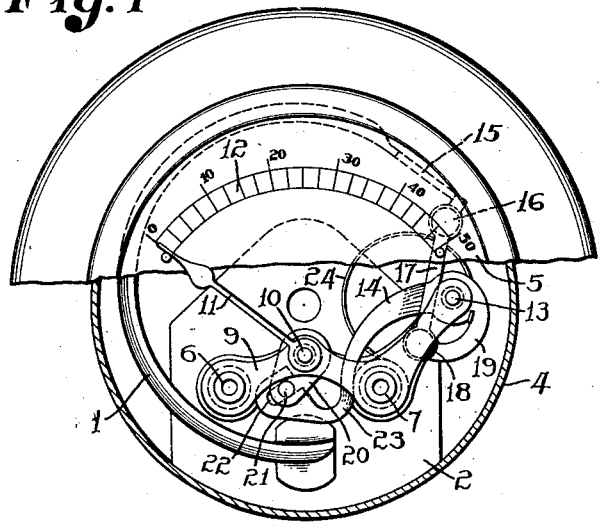
Figure 1 is a front elevation of a gage constructed according to my invention, a part of the housing being broken away in order to illustrate the working parts of the gage.
Figure 2:
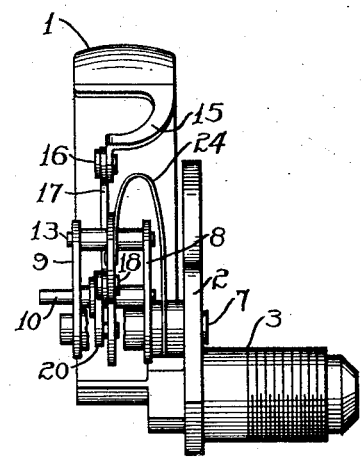
Fig. 2 is a side elevation of the gage removed from the housing.

As illustrated in Figs. 1 and 2, the gage comprises a Bourdon tube 1 secured at one end to a base 2, said base being formed with a nipple 3 by means of which it is supported and through which the Bourdon tube communicates with the pressure to be measured. The gage is adapted to be enclosed by a housing 4 at the front side of which is a dial 5. Posts 6 and 7 are secured to the base 2 and on these posts are secured spaced frame pieces 8 and 9.

A spindle or staff 10 is journaled in the frame pieces 8 and 9 between the posts 6 and 7, somewhat above the same and below the center of the instrument. A needle 11 secured to the spindle 10 indicates on a scale 12 formed on the dial either the relative or absolute pressure in the system. A spindle or staff 13 mounted in the frame pieces 8 and 9 near one side of the housing constitutes a fulcrum for an intermediate lever 14 through the medium of which motion is transmitted from the end of the tube 1 to the needle 11. In order to connect the tube 1 to the intermediate lever, the extended end 15 of the tube is pivotally connected at 16 to one end of a link 17, the other end of which is pivotally connected at 18 to the curved short arm 19 of the lever 14.

It will be noted that the short lever arm 19 is curved toward the center of the instrument so that as the extremity of the tube 1 is moved outwardly by an increase in pressure, power is transmitted through the link 17 in a line between the fulcrum 13 and the center of the instrument. This permits the fulcrum 13 to be located near the periphery of the housing and permits a comparatively long lever arm 14 to be used with a corresponding multiplication of movement.

A crank 20 is secured to the spindle or staff 10 and has a directional trend away from the fulcrum 13. This crank carries a pin 21 which engages a slot 22 in the end of the lever arm 14, which is curved, as at 23, to extend around the spindle 10. This location of the crank 20 with its pin 21 beyond the spindle 10 also permits the use of a longer lever arm with a consequent increase in the multiplication. The crank 20 is short in comparison with the needle 11 and this results in a further multiplication of movement between the end of the tube 1 and the end of the needle 11.

This double multiplication of movement is quite important since the movement of the end of the tube 1 has a comparatively small amplitude. At the same time, because of the high multiplication of movement, it is quite necessary to prevent lost motion in the various connections, if an accurate reading is to be obtained. For this purpose a spring 24 is arranged so that it will constantly urge the intermediate lever in opposition to the motion caused by the movement of the tube 1 in response to increased pressure. This spring may be comparatively light since it only has to overcome the weight or inertia of the comparatively light lever 14 and the indicator itself. This spring may be of any type desired and may be attached in any suitable manner. A very simple, inexpensive and effective construction is shown in Figs. 1 and 2 in which a bow spring is attached at one end to the post 7 and at the other end engages the angle between the hub of the lever 14 and the curved short arm 19.

The arm 19 is formed from metal which can be bent so that it may be adjusted to proper position to give the correct zero reading, and so that the needle will be instantly responsive to low initial pressures. The shape of the slot 22 may be such that the end of the needle will at any point move through substantially equal arcs for the same variation in pressure. The scale 12 may be calibrated to indicate either relative or absolute pressures.

Figure 3:
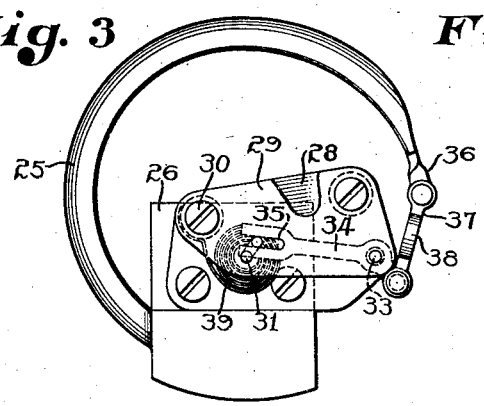
Fig. 3 is a front elevation of a modified form of the invention, the housing being removed.
Figure 4:
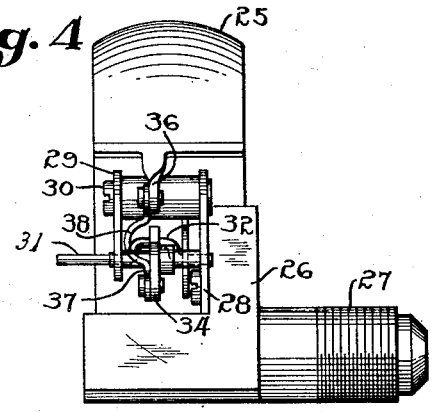
Fig. 4 is a side elevation of the construction shown in Fig. 3.

In the modification illustrated in Figs. 3 and 4, the Bourdon tube 25 is secured at one end to a base 26 having a nipple 27 through which the tube communicates with the pressure to be measured. A plate 28 is secured to the base 26 and a plate 29 is suitably secured in spaced relation to the plate 28 by means of screws 30 or the like. A spindle 31, adapted to receive an indicator, is journaled in the plates 28 and 29 and is formed with a crank 32 which is the equivalent of the crank arm 20 and pin 21 shown in Fig. 1. A spindle 33 mounted in the plates 28 and 29 is adapted to receive an intermediate lever 34, the long arm of which is formed with a slot 35 to receive the crank 32. The extended end 36 of the tube 25 is connected to the short arm of the lever 34 by a link 37. This link has an intermediate bowed portion 38 which may be adjusted by bending to secure the desired distance between the extended portion 36 of the tube and the short arm of the lever, so as to secure the correct initial reading. A spring 39 connected with the spindle 31 tends to move the indicator toward zero and to take up any lost motion which might otherwise occur by reason of loose connections. The prevention of this lost motion is of the gretest importance, since, because of the great multiplication of movement between the tube and indicator, such lost motion would result in a considerable error in the indication of initial pressure. While the form shown in Figures 3 and 4 differs considerably in its detailed construction from that shown in Figs. 1 and 2, its principle of operation is substantially the same. It secures a double multiplication of movement between the end of the tube 25 and the indicator. The ratio of multiplication effected by the lever 34 will, however, be somewhat less, as compared with the size of the instrument, than that effected by the lever 14.

While I have shown and described specifically two forms in which the invention may be embodied, it will be understood that these are merely for the purpose of illustration, and that the invention is capable of embodiment in many other forms without any material departure from the scope thereof as claimed.

What I claim is:

1. In a pressure gage, the combination of a support, a Bourdon tube secured at one end thereto, an indicator journaled on said support, a crank secured to said indicator, a lever fulcrumed on said support and having a long arm and a short arm, said long arm being operatively connected to said crank and having an effective length greater than the distance between the fulcrum and the axis of the indicator, and means for transmitting force from the movable end of the tube to the short arm of the lever in a line which lies between the fulcrum and the axis of the indicator.

2. In a pressure gage, the combination with a support, a Bourdon tube secured at one end thereto, an indicator journaled on said support, a lever fulcrumed on said support and having a long arm and a short arm, a link connecting said short arm to the movable end of the tube in a line between the fulcrum and the axis of the indicator, said long arm being curved about the axis of the indicator and having a slot beyond said axis, and a crank on said indicator engaging said slot.

3. In a pressure gage, the combination with a support, a Bourdon tube secured at one end thereto, an indicator journaled on said support, a lever fulcrumed on said support and having a long arm and a short arm extending from opposite sides of the fulcrum, a link connecting the end of the short arm to the movable end of the tube, the end portion of said short arm being curved away from the tube and backwardly past the fulcrum, so that the link is disposed in a line between the fulcrum and the axis of the indicator, said long arm being curved about the axis of the indicator and having a rearwardly facing slot beyond said axis, and a crank on said indicator provided with a pin engaging said slot.

In testimony whereof I have hereunto signed my name to this specification.

CLARK M. ADAMS.